United States Patent [19]
Berry et al.

[11] Patent Number: 6,018,341
[45] Date of Patent: Jan. 25, 2000

[54] DATA PROCESSING SYSTEM AND METHOD FOR PERFORMING AUTOMATIC ACTIONS IN A GRAPHICAL USER INTERFACE

[75] Inventors: Richard Edmond Berry; Scott Harlan Isensee, both of Georgetown, Tex.; David John Roberts, Stockton, United Kingdom; Craig Ardner Swearingen, Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/753,079

[22] Filed: Nov. 20, 1996

[51] Int. Cl.⁷ ........................................................ G06F 3/00
[52] U.S. Cl. .......................... 345/344; 345/343; 345/339; 345/970
[58] Field of Search .................................. 345/333, 336, 345/343, 346, 347, 339, 349, 350, 115, 116, 156, 342, 344, 345; 379/93.17, 93.23

[56] References Cited

U.S. PATENT DOCUMENTS

| | | | |
|---|---|---|---|
| 5,455,854 | 10/1995 | Dilts et al. | 379/201 |
| 5,457,738 | 10/1995 | Sylvan | 379/96 |
| 5,533,102 | 7/1996 | Robinson et al. | 379/67 |
| 5,555,297 | 9/1996 | Ochy et al. | 379/136 |
| 5,675,755 | 10/1997 | Trueblood | 345/346 |
| 5,721,849 | 2/1998 | Amro | 345/340 |

OTHER PUBLICATIONS

Smith Micro Software Quick Link Message Center Ver 2.01 Copyright 1994.

SmithMicro Software Quick Link Message Center Revision 2.01 Copyright 1994.

*Primary Examiner*—Raymond J. Bayerl
*Assistant Examiner*—Cao H. Nguyen
*Attorney, Agent, or Firm*—Winstead Sechrest & Minick P.C.; Volel Emile

[57] ABSTRACT

A data processing system and method for operation thereof perform an automatic function when an external user modifies a focus of a window displayed on a display device. For example, assume a window provides an object form of a telephony application. When the external user switches the system focus to the phone window and is in a state awaiting a user action, such as answering a ringing telephone, the answering action is automatically performed concurrently with the focus change.

18 Claims, 7 Drawing Sheets

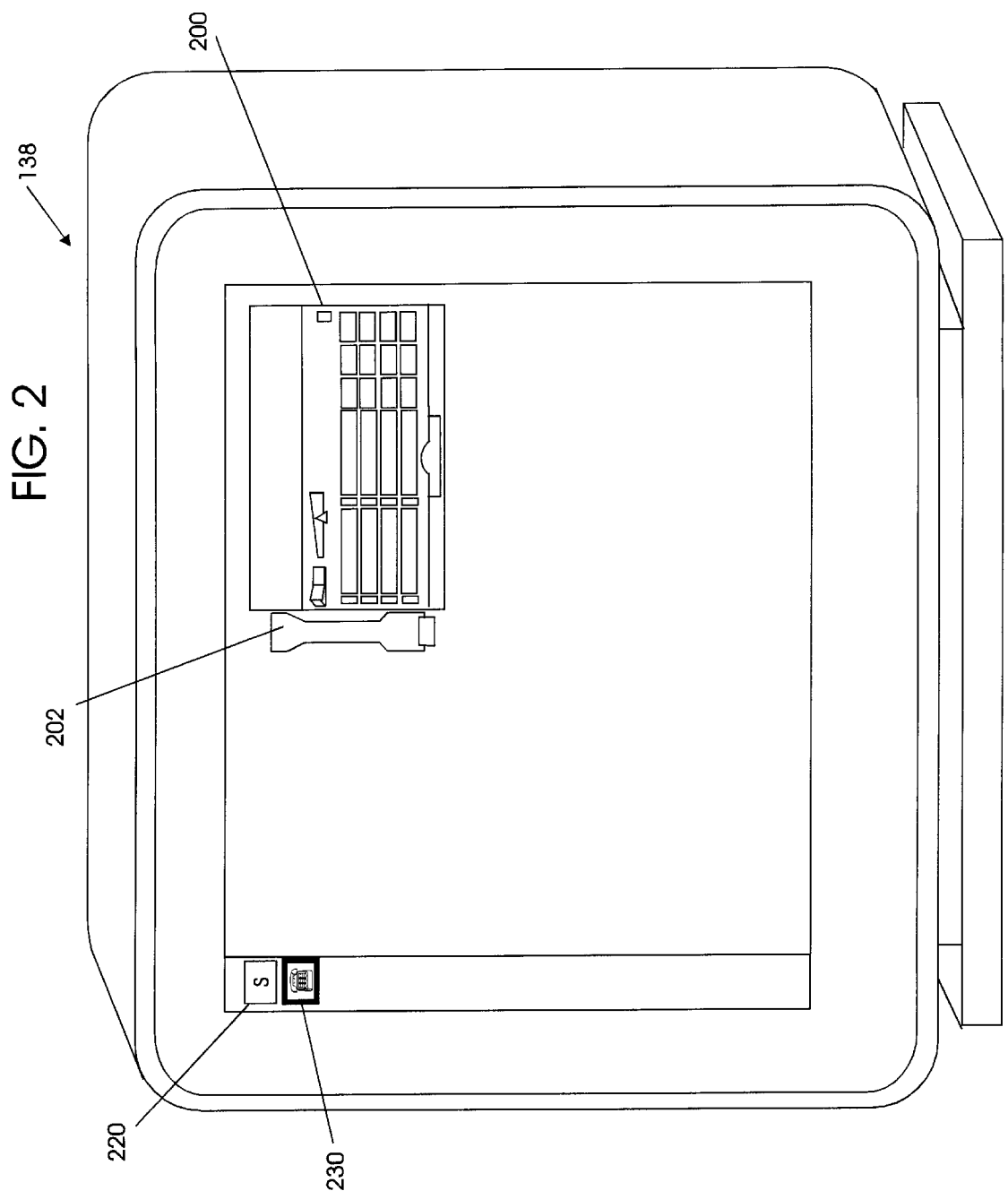

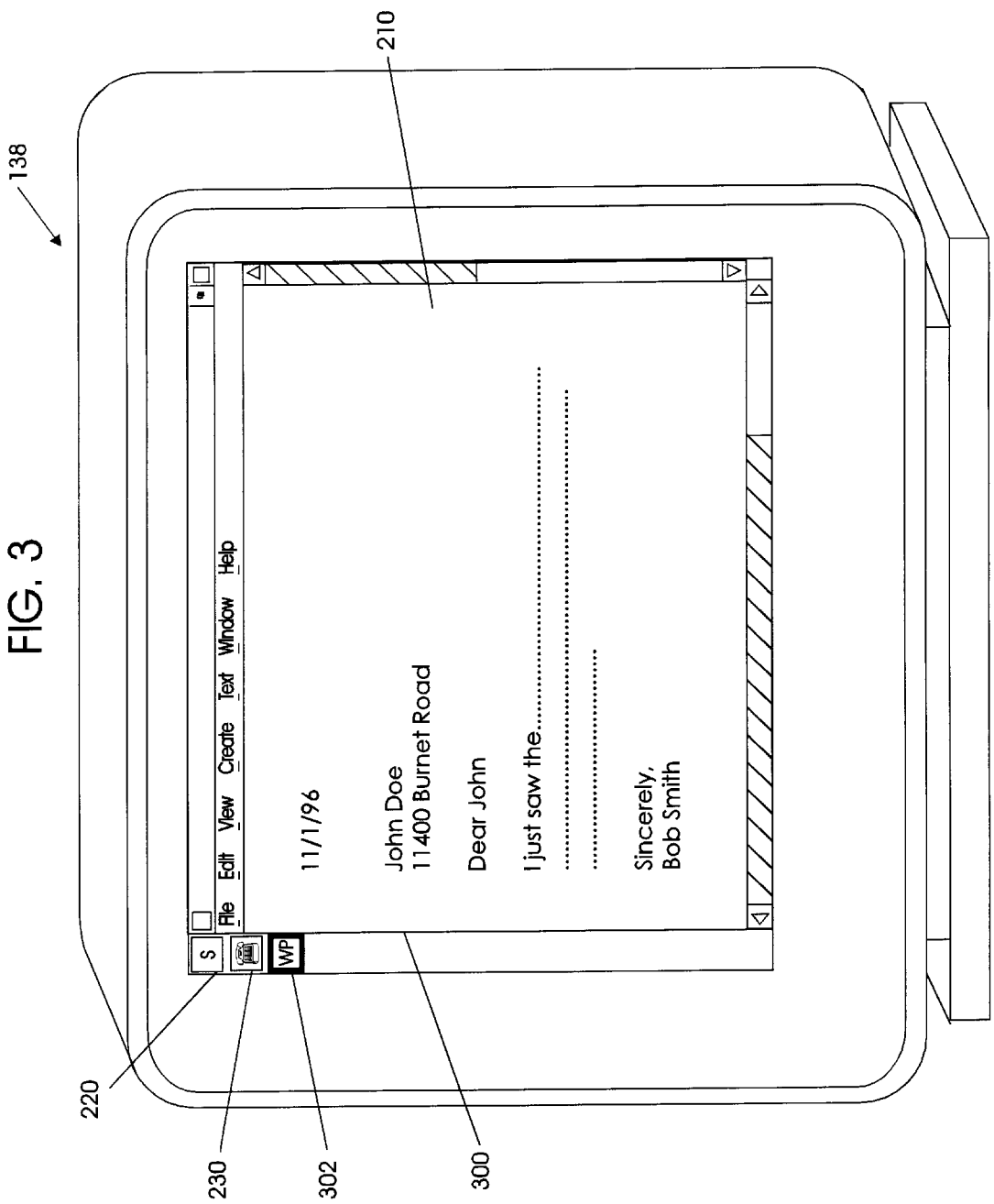

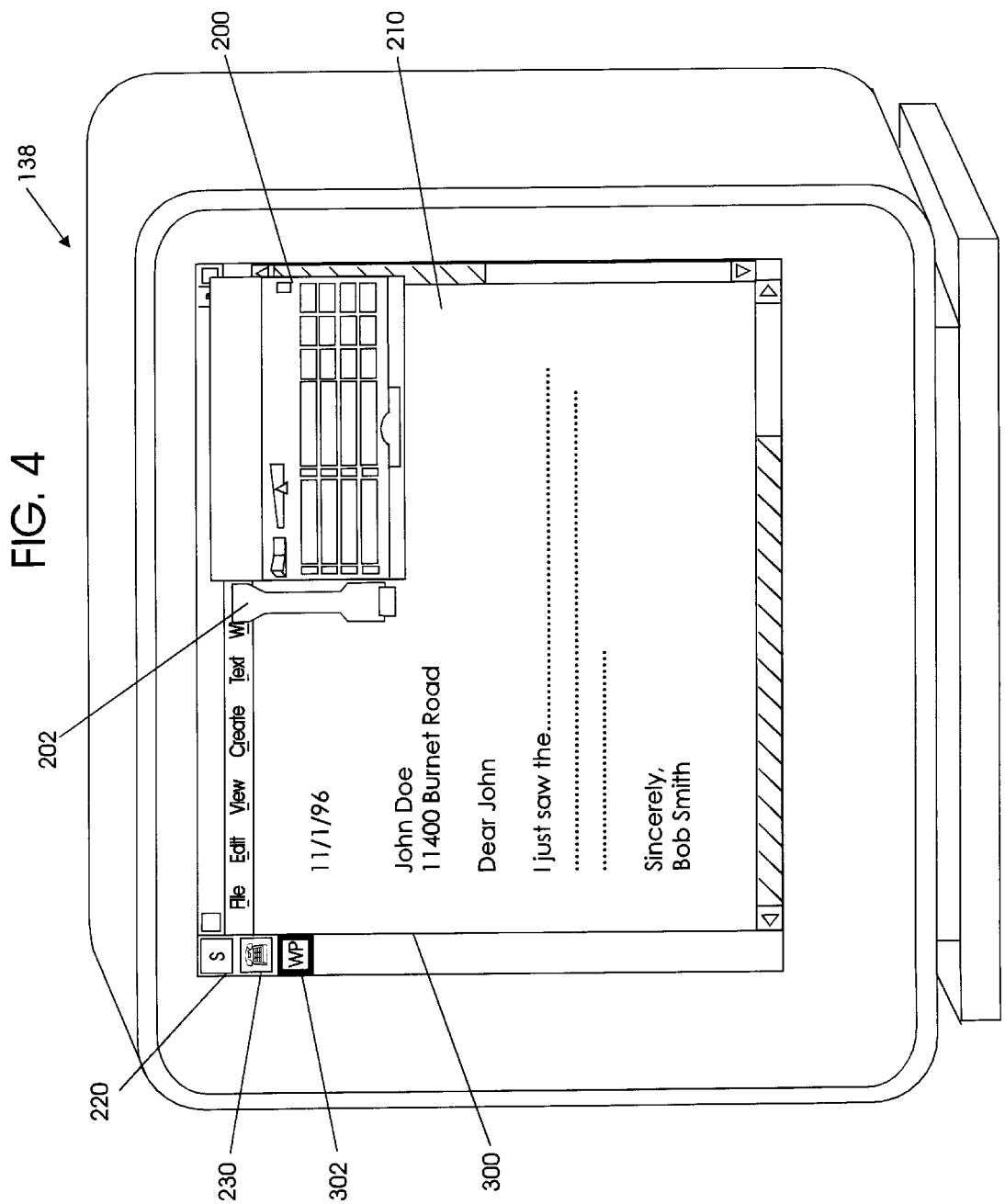

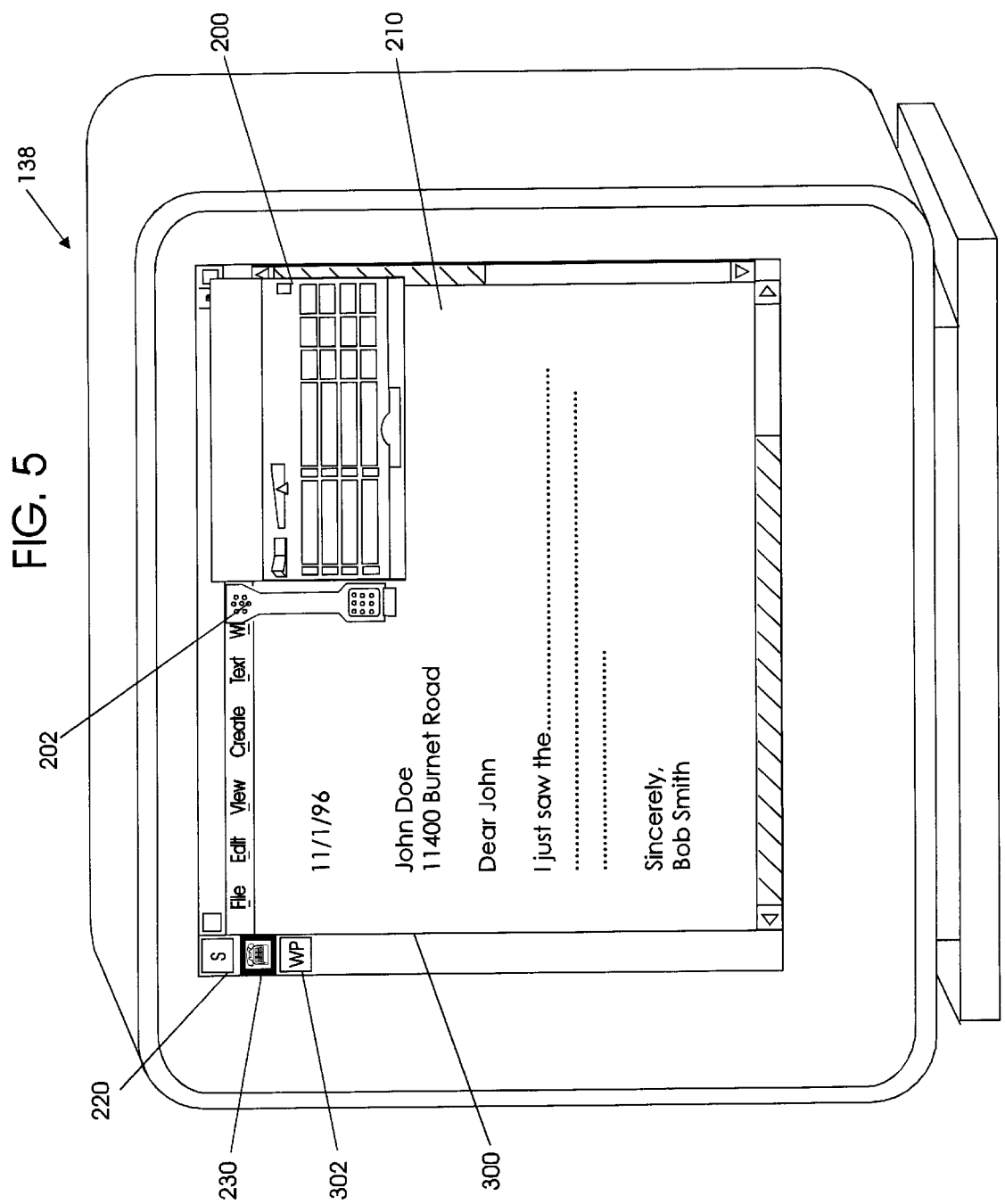

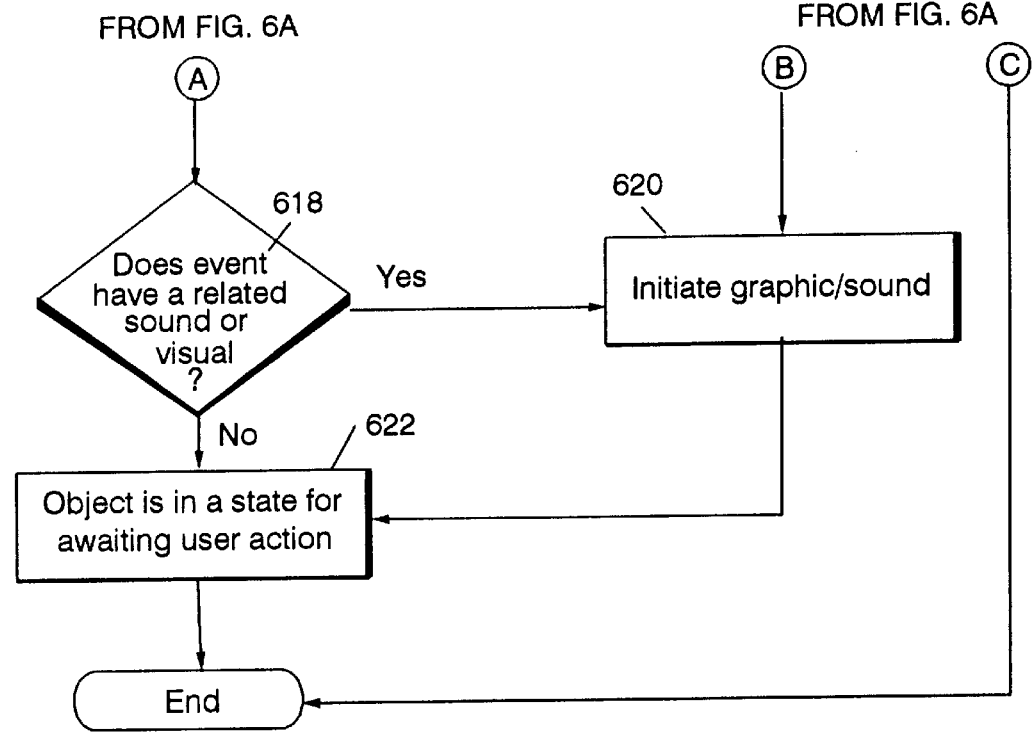
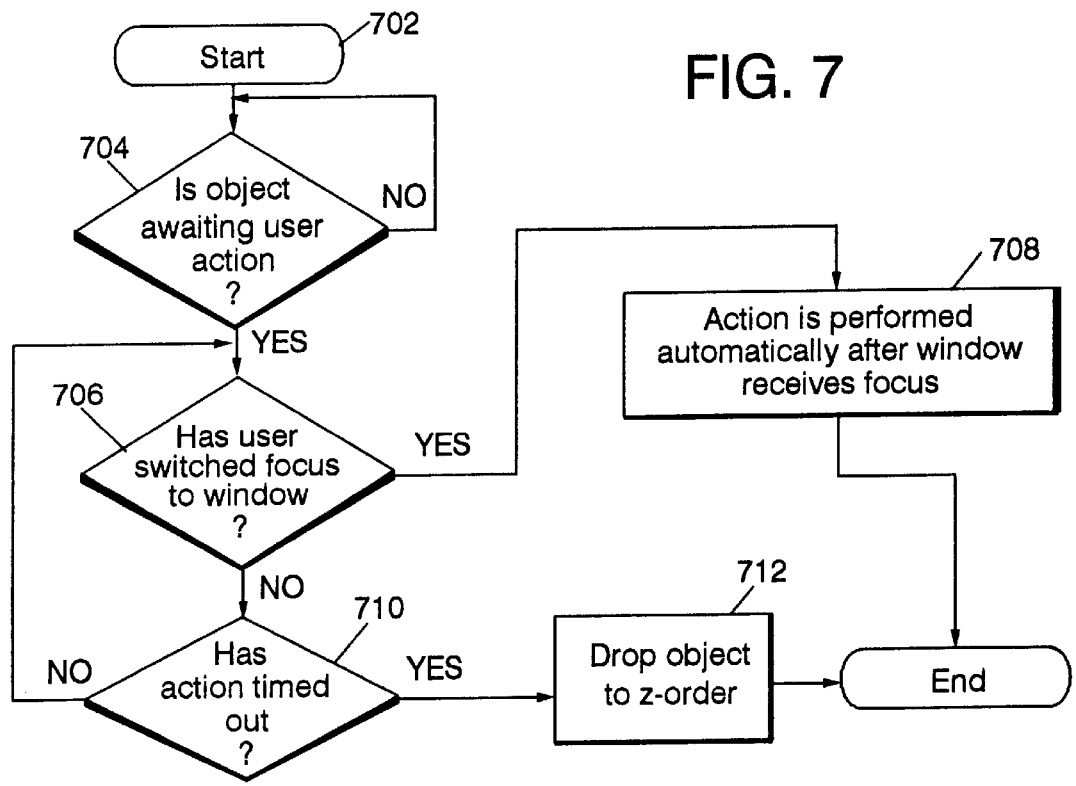

DATA PROCESSING SYSTEM AND METHOD FOR PERFORMING AUTOMATIC ACTIONS IN A GRAPHICAL USER INTERFACE

CROSS-REFERENCE TO RELATED APPLICATIONS

The present application is related to the following applications:

Ser. No. 08/753,081, entitled "CREATING REAL-WORLD OBJECTS" (Attorney Docket AT9-96-204);

Ser. No. 08/753,082, entitled "DATA PROCESSING SYSTEM AND METHOD FOR CONTROLLING A VIEW OF A REALISTIC OBJECT IN A DISPLAY DEVICE" (Attorney Docket AT9-96-212);

Ser. No. 08/753,077, entitled "PRIORITIZATION OF BACKGROUND DISPLAY DURING ANIMATION" (Attorney Docket AT9-96-213);

Ser. No. 08/753,122, entitled "MULTIFUNCTIONAL OBJECT" (Attorney Docket AT9-96-214);

Ser. No. 08/753,076, entitled "SYSTEM AND METHOD FOR MAINTAINING SIZE AND POSITION RELATIONSHIPS FOR NON-RECTANGULAR REAL WORLD OBJECTS" (Attorney Docket AT9-96-237);

Ser. No. 08/753,124, entitled "DATA PROCESSING SYSTEM AND METHOD FOR SCALING A REALISTIC OBJECT ON A USER INTERFACE" (Attorney Docket AT9-96-240).

Ser. No. 08/753,078, entitled "DATA PROCESSING SYSTEM AND METHOD FOR VIEWING OBJECTS ON A USER INTERFACE" (Attorney Docket AT9-96-241); and Ser. No. 08/753,246, entitled "DATA PROCESSING SYSTEM AND METHOD FOR MODIFYING A SIZE OF A REALISTIC OBJECT ON A USER INTERFACE" (Attorney Docket AT9-96-246).

All of the above applications are being filed on the same date as the present application and assigned to the assignee of the present application.

TECHNICAL FIELD

The present invention relates in general to data processing systems, and in particular, to an object displayed on a display device of a data processing system.

BACKGROUND INFORMATION

Graphical user interfaces utilize windows to display the output of several different programs on a display device at the same time. As several windows may be opened at any one time, windows may be overlapped or fully obscured by other windows. Furthermore, computer input devices, such as keyboard and voice recognition microphones, can only be associated with one window at a time and must be switched between windows. This switching operation is called a focus change.

A focus change typically occurs when a user desires to interact with a window other than the one that currently has the focus. Focus may be defined as a state of a window or object on a display device which indicates where the results of a user's interaction with a user input device will occur. A user typically indicates their intent to change focus and to interact with a window other than the one that currently has the focus, by clicking with the mouse on the desired window, by typing some key sequence using the keyboard, or by speaking some specified words using a voice recognition application. Focus change usually results in the window which receives the focus, also becoming a top most window which guarantees visibility.

In some situations, programs cause a focus change which results in control being taken away from a user unexpectedly. Such unexpected focus change is considered poor design and should be avoided as a user's input is redirected from one window to another window if the user is typing or speaking when the focus change occurs. Because the results of such unanticipated and undesired changes can be unpredictable, such changes are very undesirable.

Additionally, when a situation occurs that requires a user's attention and the window that the user must access is obscured by another, the user may have a difficult time responding to the event, especially if it is a time-crucial event. For example, when a telephone application is implemented on a user's computer, and the user is working on another activity or task, a user may receive incoming telephone calls. When this situation is encountered in some prior art systems, the user may never be aware of the incoming call if the window that includes the telephone is obscured by another window and the user is deaf or partially deaf or has lowered the volume.

However, in other prior art systems, graphical user interfaces surface a message window to a top of the window system z-order, to bring the situation to the user's attention. It should be noted that a hierarchy of windows displayed on a display device is referred to as a z-order. This name refers to an imaginary "z-axis" which extends perpendicular to the plane of the display device screen. The position that a particular window occupies along the z-axis, that is, its z-order, determines an order in which the windows are drawn above and below the particular window. For more information on z-order, refer to *Advanced OS/2 Presentation Manager Programming,* by Thomas E. Burge, et al., published by John Wiley and Sons, Inc., which is incorporated by reference herein.

In these prior art systems, the newly surfaced window takes control of activation, or the input focus for keyboard events, and the user loses control over their current activities. Thus, where a user may have been typing a letter, their keyboard input is suddenly input to the message window. As previously mentioned, this is problematic because it takes control away from users, it forces users to deal with the situation or message even if they would rather not, and it is very likely that suddenly re-directed keyboard inputs may cause an undesired result. Typically, the new window is a modal dialog box, which requires a user to respond in some manner before being able to continue to work in the current application or activity. For more information on modal dialog boxes, refer to *The Window Interface, An Application Design Guide,* published by Microsoft Press in 1992, pp. 126–27 which is incorporated by reference herein.

Thus, it is desirable to have a graphical user interface that informs a user that a situation that requires the user's attention has occurred, but still allows the user to retain control over an application to which data from a user input device is provided.

SUMMARY OF THE INVENTION

The previously mentioned needs are fulfilled with the present invention. Accordingly, there is provided, in a first form, a data processing system. The data processing system includes a display device for displaying a first object in at least one of a plurality of orders and a user interface for receiving a plurality of control inputs for selectively controlling operation of the first object displayed by the display device when the plurality of control inputs indicate the first object has focus. The data processing system includes a data processor which includes a central processing unit. The central processing unit is connected to the user interface for receiving the plurality of control inputs and is connected to the display device to provide a plurality of object control signals for enabling a first function to be performed automatically when the first object has focus.

Additionally, there is provided, in a second form, a method for operating a data processing system. The method includes the steps of displaying a first object on a display device, determining when the first object has focus, and performing a preselected action automatically when the first object has focus.

As well, there is provided in a third form, a computer program stored on a computer readable medium for executing a method for operating a data processing system. The computer program includes means for enabling a display device to display a first object, means for enabling a central processing unit to determine when the first object has focus, and means for enabling the central processing unit to perform a preselected action automatically when the first object has focus.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates, in block diagram form, a display device in accordance with one embodiment of the present invention;

FIG. 3 illustrates, in block diagram form, a display device in accordance with one embodiment of the present invention;

FIG. 4 illustrates, in block diagram form, a display device in accordance with one embodiment of the present invention;

FIG. 5 illustrates, in block diagram form, a display device in accordance with one embodiment of the present invention;

FIG. 6-B illustrates, in flow diagram form, a second portion of the methodology of FIG. A; and FIG. 7 illustrates, in flow diagram form, a methodology for performing a function automatically in accordance with one embodiment of the present invention.

DETAILED DESCRIPTION

Figure 1:
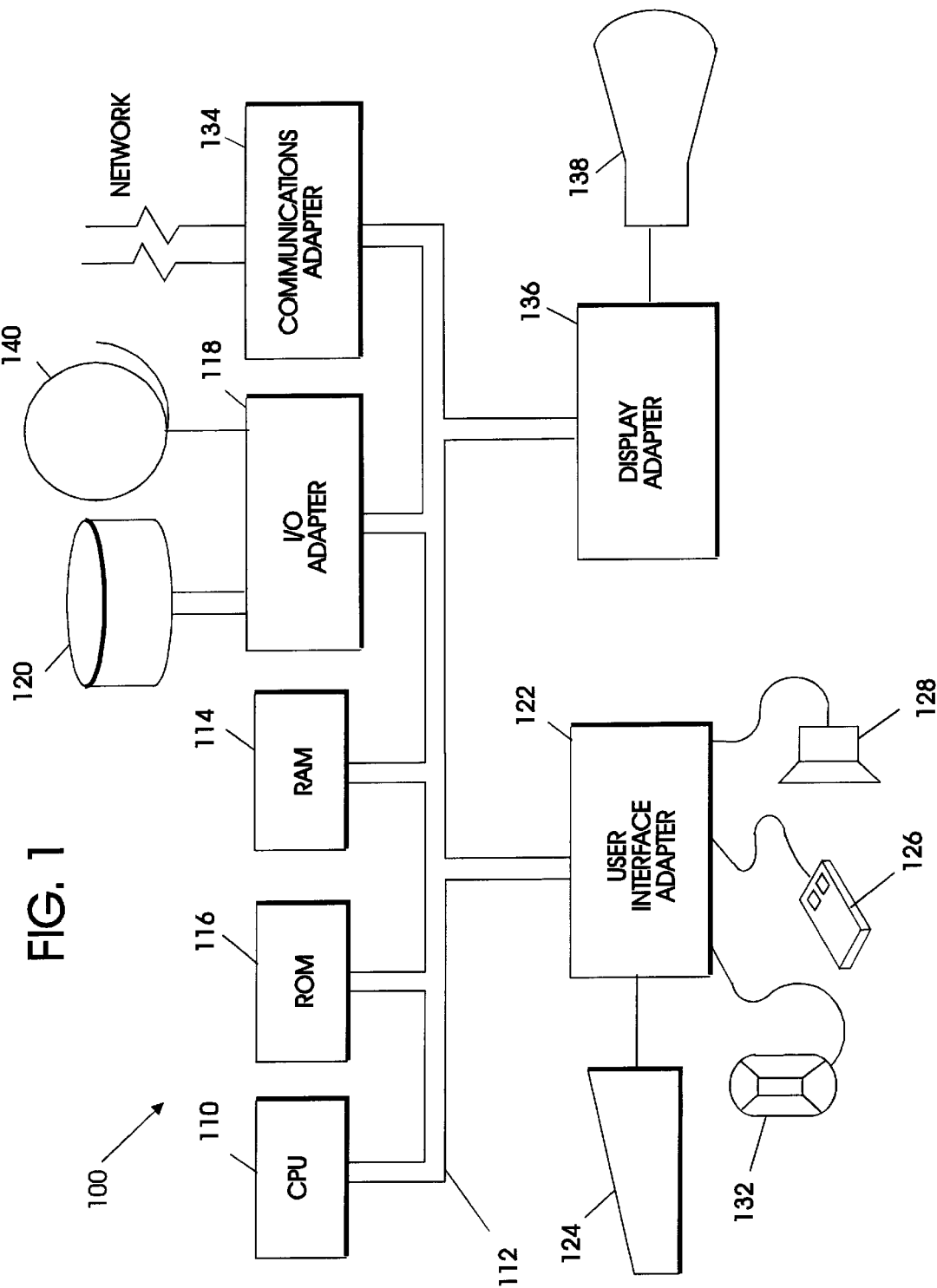
FIG. 1 illustrates, in block diagram form, a data processing system in accordance with one embodiment of the present invention.

The present invention provides a data processing system, software program, and method for operating each which provides a visible indication that the user's attention is required for an obscured application, without changing the focus of activation and without talking away a user's control over their input. In the present invention, a method is implemented in the data processing system which allows the window itself to be surfaced rather than a message window. Thus, quick and convenient access to all of the functions available in the window are provided without the additional steps required by a message window. For more information on message windows, refer to *Object-Oriented Interface Design IBM Common User Access Guidelines,* published by Que in December 1992, which is incorporated by reference herein.

To briefly describe the methodology of the present invention, the following description and examples will be given. However, it should be noted that additional clarification will be provided in subsequent discussions herein. During execution of the methodology of the present invention, when a situation occurs in which a window needs to be brought to a user's attention, that window is surfaced at the top of the window system z-order without modifying the current activation state of the window. By using such a methodology, the window in question is guaranteed to be visible or unobscured by any other windows and since the current activation state is not changed, user input is still in control of the user.

Upon detection of a situation of which user's should be aware, a window in question is superimposed over any other windows that may be open and set to be at the top of the window system z-order. If the window has been obscured, then the window will be surfaced and fully visible. If the window had not been obscured, then there is no visible change in the window arrangement and any visual change within the window will be unobscured and visible to the user. It should be noted that when a window is set at the top of the z-order, the window does not take over activation, or control, of keyboard inputs. While z-order changes have typically been coupled with activation changes in prior art windowing systems, the present invention specifically dictates that there should be no activation change. Stated another way, in the present invention, whatever window has the focus of activation will retain that focus, despite any change in z-order. Because there is no activation change, the user's control over his current task and user interface input is preserved.

An example in which the present invention may be implemented will be described below. For this example, assume that a program provides the function of a telephone using a graphical user interface. The program displays a window representing the telephone thereon. This window allows the user to answer the phone and make calls. For convenience, a user will typically keep this window open on the display, but make it relatively small compared to other windows. When the phone rings, its window is automatically made top-most, but a focus change does not occur. Thus, the user is allowed to see the phone, in addition to potentially hearing it, but the modified display does not interrupt the user's current typing or voice input. The user can then switch focus to the phone window when desired, using the mouse, keyboard, voice command, or some other equivalent input means.

In the present invention, when the user switches focus to the phone window and is in a state awaiting a user action, such as answering a ringing telephone, that action is automatically performed along with a focus change. The action to be performed can be defined by a programmer during design or it may be a user programmable option. Additionally, a menu of choices might be automatically presented with the most likely action highlighted as the default action. In the case of the telephone, the user is saved several steps when the present embodiment of the invention is implemented. For example, in the present invention, the automatic display modification and automatic performance of an action together with a focus change, saves the user the steps of finding and displaying the window, as well as answering the phone. In time-urgent situations, such as answering a ringing phone, this approach simplifies a user's task to a simple reflex action such as clicking on the now visible window, pressing a single shortcut key, or speaking a word like "hello." Such shortcut mechanisms for focus changes are well-known in typical graphical user interfaces and will not be described in greater detail herein. Finally, should the user choose not to respond to the situation, the action can be timed out and the window can be dropped back down in the z-order.

The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of a data processing system 100 in accordance with the subject invention having central processing unit (CPU) 110, such as a conventional microprocessor, and a number of other units interconnected via system bus 112. Data processing system 100 shown in FIG. 1 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, speaker 128, microphone 132, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

The present invention implements a software program in data processing system 100 illustrated in FIG. 1. This software program may be implemented in either ROM 116 or RAM 114 and its execution is controlled by CPU 110. By accessing the software program in either ROM 116 or RAM 114, an object is displayed to the user on display device 138. In the following description of the invention, the object that will be discussed is a telephone. However, it should be noted that the present invention may be expanded to apply to other objects, not described in detail herein.

Referring to FIG. 2, display device 138 and the objects illustrated thereon are provided. It should be noted that the objects illustrated on display device 138 are determined by a remaining portion of data processing system 100. For example, CPU 110 controls the data communicated between display adapter 136 and both ROM 116 and RAM 114 to determine an object displayed on display device 138. In display device 138 of the present invention, window 200, which illustrates a telephone, is at the top of the window system z-order as reflected by focus indicator 230. Focus indicator 230 has a dark border around it to indicate that a corresponding window is at the top of the window system z-order. If any other applications were open at this point and time and displayed on screen 210 of display device 138, window 200, also referred to as telephone 200, would be superimposed over any other windows because it is at the top of the window system z-order.

FIG. 3 illustrates a system in which telephone 200 is still an active application, but a word processing application has been moved to the top of the window system z-order. Because word processing application 300 is at the top of the window system z-order, focus selector 302 is illustrated on screen 210 of display device 138 with a bold border around it. As with any word processing application, assume that a user is providing inputs via keyboard 124 or mouse 126. The inputs are then adapted by user interface adapter 122 and processed by CPU 110 to modify the objects displayed by screen 210 of display device 138.

Referring to FIG. 4, assume that a user is providing an input to the word processing application represented by window 300 when telephone 200 receives an incoming call. As such an incoming call is a situation which must be brought to the user's attention, the window which includes telephone 200 is set to be at the top of the window system z-order and, therefore, is superimposed over window 300. It should be noted that while telephone 200 is at the top of the window system z-order, the focus of the system is not modified (as indicated by the bold border around focus selector 302). Thus, any user inputs are directed to the application represented by window 300 and are not used to access or control the application of telephone 200. Stated another way, when telephone 200 receives an incoming call and rings, its window is automatically made the top-most in the window system z-order, but this does not cause a focus change. Rather, the surfacing of telephone 200 allows a user to view telephone 200, in addition to potentially hearing it, but does not interrupt the user's current typing or voice input to another application. The user can then switch focus to the telephone window when they are ready, using a user input device such as a mouse, keyboard, or voice commands.

Figure 6A:
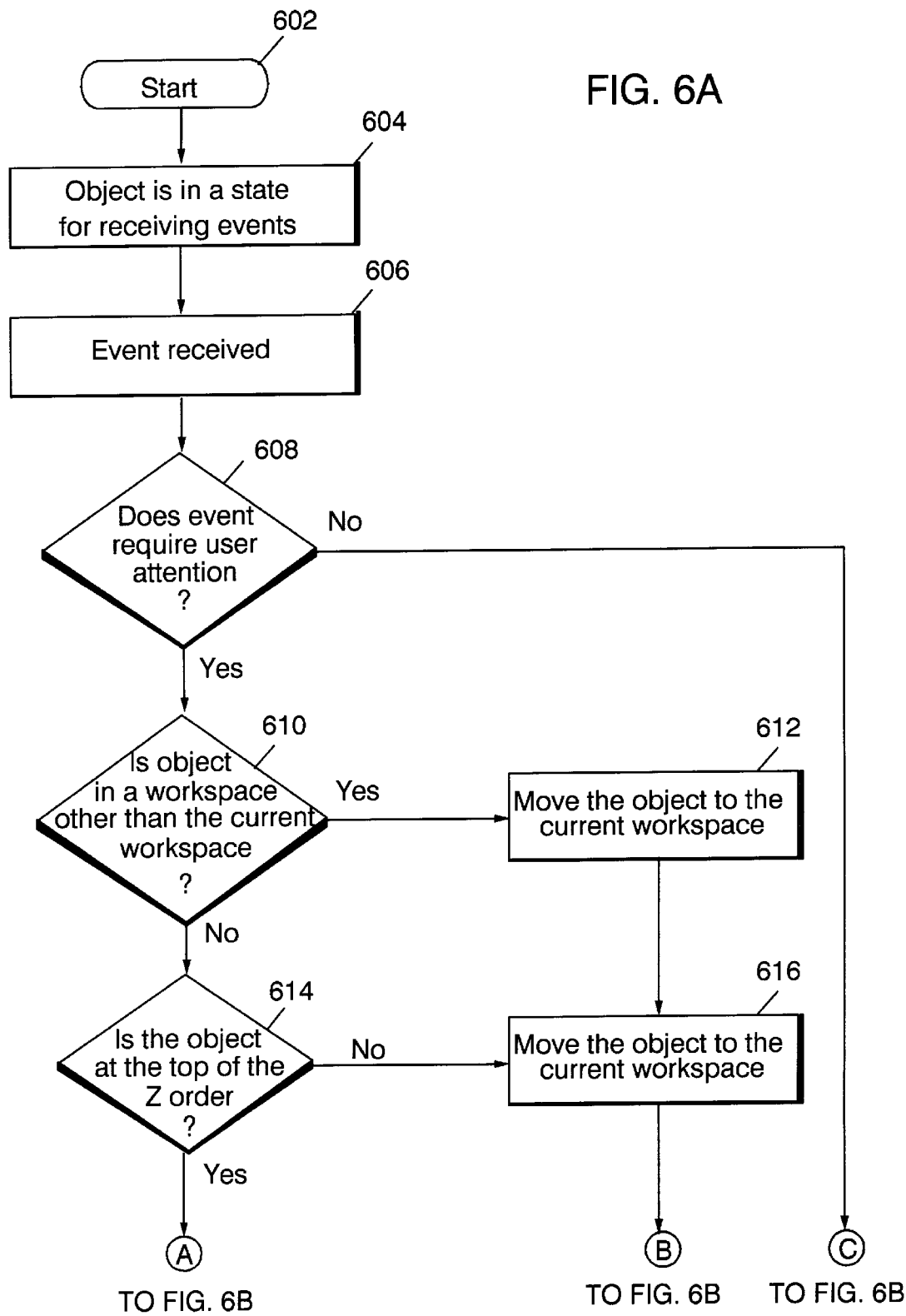
FIG. 6-A illustrates, in flow diagram form, a methodology for displaying a window in a display device in accordance with one embodiment of the present invention.

A flow chart, which is implemented by the software of the present invention is illustrated in greater detail in FIG. 6. To implement the methodology of the present invention described above, CPU 110 executes the following steps to establish a window system z-order of the objects displayed on display device 138. In step 604, CPU 110 determines whether or not an object is in a state for receiving events. Basically, when an object is in a state for receiving events, the application which it represents is opened, but not necessarily in focus or at a top of the window system's z-order. Next, an event is received in step 606. In the present example, such an event may be an incoming call on telephone 200. It must then be determined whether the event requires the user's attention in step 608. If the event does not require user attention, data processing system 100 and CPU 110 therein continue operating in a normal manner. However, if the event does require user attention, it must be determined whether the object is in a work space other than the current work space, or at the top of the z-order, of the window system in a step 610. The current work space is a view of the objects opened on a display device screen which are currently visible. If the object is not in a work space other than the current work space, it must be determined whether the object is at the top of the z-order in a step 614. If the object is in a work space other than the current work space, the object must be moved to the current work space in a step 612.

Next, the object is brought to the top of the z-order without changing the focus of the application in a step 616. Additionally, when the object is not at the top of the z-order in step 614, the object is also brought to the top of the z-order without changing the focus of the application in step 616. It should be noted that modification of an object's z-order and an objects focus are both well known in the data processing art. Thus, the steps required for modifying a z-order and for modifying a focus will not be described in greater detail herein. For more information of modification of the z-order and the focus of an object, refer to *OS/2 Programmer's Reference,* Volume 1, published by Microsoft Press in 1989, which is hereby incorporated by reference herein. As previously described, prior art implementations change both the focus and z-order of an accessed object concurrently and this action may result in an undesirable operation. The present invention recognizes that each of these known steps should not be executed concurrently, but should be executed separately and not necessarily consecutively.

After the object is brought to the top of the z-order without changing the focus, associated graphic or sound operations are selectively initiated in a step 620. For example, in the present invention, flashing light or a telephone ringing sound may be initiated when the object is brought to the top of the z-order, even though the focus of the application is not changed. After initiating the graphic or sound operation, the object is then in a state awaiting user action in a step 622. Additionally, if the object is at the top of the z-order in step 614, it is next determined whether the event has a related sound or visual operation associated therewith. If yes, step 620 is executed. If not, the object is then placed in a state awaiting user action in step 622.

As an example, refer to FIG. 4. If an incoming call is received by telephone 200, the event requires user attention. In FIG. 4, telephone 200 is not in the current work space as the user is executing a word processing function in window 300. Therefore, step 612 is executed to move the telephone to the current work space and, subsequently, to bring the object to the top of the z-order without changing the focus of the application. Thereafter, telephone 200 may ring or flash as appropriate to indicate that it is in the state awaiting user action.

Continuing with the present example, when the user switches focus to the window associated with telephone 200 and because telephone 200 is in a state awaiting a user action (answering the telephone), that user action is automatically performed along with the focus change. Thus, when a user changes focus to access telephone 200 upon receipt of an incoming call, an answer action is automatically performed along with the focus change.

In one embodiment of the present invention, the answer action is visually indicated by turning the handset of the telephone over on the object displayed by display device 138. The appearance of the object on screen 210 of display device 138 when this automatic action is performed is illustrated in FIG. 5. As seen therein, telephone 200 is at the top of the z-order as it is superimposed over word processing application 300. Furthermore, handset 202 is turned over to indicate that an answer action is being performed and focus indicator 230 is outlined in bold to indicate that telephone 200 currently has a focus so that a user may answer the incoming call. Should the user have chosen not to answer telephone 200, a timeout would occur and telephone 200 would drop to its previous position in the z-order. Thus, screen 210 of display device 138 would appear as it does in FIG. 3. A flow chart implemented by the software of the present invention for performing this automatic action is illustrated in greater detail in FIG. 7.

The methodology used for implementing the present invention will subsequently be discussed. Referring to FIG. 7, it must first be determined whether the object which is at the top of the z-order is awaiting a user action in a step 704. If not, step 704 is repeated until the object is awaiting a user action. Next, in a step 706, it is determined whether or not the user has switched a window system focus to a window associated with the object. If not, step 706 is repeated until the user has switched the focus to the window or the action times. Once the action times out (step 710), the object may drop down to its past z-order (step 712). It should be noted that the user switches the focus to the window by "clicking" the mouse when the cursor is positioned over the window or performing some other enabling step using a user interface device. Subsequently, in a step 708, when the focus is switched to the desired window, an action is performed automatically after the window has the focus in step 708. As illustrated in the example of FIG. 5, a handset 202 of telephone 200 is automatically turned over to visually indicate that the incoming call has been answered. Additionally, it should be noted that other operations could be performed automatically in other applications.

It should be noted that the action to be performed is determined by a programmer during a design phase of data processing system 100. In an alternate embodiment, the action to be performed automatically could be a user option which is selectable by a user. Furthermore, a menu of choices might be automatically presented to the user wherein a most likely action is highlighted as the default action. Through the use of such automatic actions, a user may save several steps in performing a desired operation. In the case of the telephone, the user is saved several steps of finding and displaying the window, and then answering the phone. In time-critical situations, such as answering a ringing phone, the approach of the present invention simplifies a user's task to a single reflex action such as the clicking on the now visible window, pressing a single shortcut key, or speaking a word like "hello."

By now it should be apparent that there has been provided a data processing system and methodology for bringing a hidden application to a user's attention without taking control away from the user with respect to a current task or activity and for allowing a user to have an appropriate action performed automatically when a focus is switched between windows in a graphical user interface. There are many additional configurations for implementing the inventions described above. Additionally, while there may have been described herein the principles of the invention, it is to be clearly understood to those skilled in the art that this description is made by way of example and not as a limitation to the scope of the invention. Accordingly, it is intended, by the appended claims, to cover all modifications of the invention which fall within the true spirit and scope of the invention.

What is claimed is:

1. A data processing system, comprising:

a display device for displaying a first object in at least one of a plurality of orders;

a user interface for receiving a plurality of control inputs for selectively controlling operation of the first object displayed by the display device when the plurality of control inputs indicate the first object has focus; and a data processor comprising a central processing unit, wherein the central processing unit is coupled to the user interface for receiving the plurality of control inputs and coupled to the display device to provide a plurality of object control signals for enabling a first function to be performed automatically when the first object obtains focus from a non-focus state, wherein the display device displays a second object, wherein the first object is at a top of a z-order during the non-focus state.

2. The data processing system of claim 1 wherein the second object has focus during the non-focus state.

3. The data processing system of claim 2 wherein the plurality of control inputs are modified to indicate the first object has focus.

4. The data processing system of claim 3 wherein the plurality of control inputs control operation of only the first object displayed by the display device when the first object has focus.

5. The data processing system of claim 1 wherein the plurality of object control signals selectively modify an appearance of the first object displayed on the display device to indicate the first function is performed.

6. The data processing system of claim 1 wherein the first object is a telephone.

7. The data processing system of claim 6 wherein the first function is answering the telephone.

8. A method for operating a data processing system, comprising the steps of:

displaying a first object on a display device, wherein the first object does not have focus;

receiving an input causing the first object to obtain focus;

performing a preselected action automatically when the first object obtains focus; and displaying a second object which has focus when the first object has no focus, wherein the first object is displayed at a higher z-order than the second object.

9. The method of claim 8, further comprising the steps of:

displaying a second object which has focus when the first object has no focus, wherein the first object is displayed at a higher z-order than the second object.

10. The method of claim 8, further comprising the step of:

automatically dropping the first object to a z-order level lower than the second object after a period of time if the first object does not receive focus.

11. The method of claim 8, further comprising the step of:

selectively modifying an appearance of the first object displayed on the display device to indicate the first function is performed.

12. The method of claim 8 wherein the first object represents a telephony application.

13. The method of claim 12, wherein the performing step further comprises the step of:

answering an incoming call automatically when the first object obtains focus during the receiving step.

14. A computer program stored on a computer readable medium, operable for executing the program steps comprising:

enabling a display device to display a first object;

enabling the display device to display a second object, wherein the second object has focus;

enabling a central processing unit to change the focus from the second object to the first object; and enabling the central processing unit to perform a preselected action automatically when the first object receives focus, wherein the first object is displayed with a higher z-order than the second object when the second object has focus and before the first object receives focus.

15. The computer program for executing the method of claim 14 wherein the preselected action is performed substantially simultaneously with the receiving of focus by the first object.

16. The computer program for executing the method of claim 14 further comprising the program step of:

selectively enabling the central processing unit to modify an appearance of the first object displayed on the display device to indicate the first function is performed.

17. The computer program for executing the method of claim 14 wherein the first object represents a telephony application.

18. The computer program for executing the method of claim 17, wherein the preselected action further comprises the step of:

answering an incoming call automatically when the first object has focus.

* * * * *